Patented May 10, 1949

2,469,995

UNITED STATES PATENT OFFICE 2,469,995

PROCESS FOR THE PRODUCTION OF FOOD PREPARATIONS FROM POTATOES AND SIMILAR FARINACEOUS TUBERS

Martin Carl Schaul, London, England

No Drawing. Application December 26, 1946, Serial No. 718,598. In Great Britain July 23, 1946

3 Claims. (Cl. 99—207)

This invention relates to a process for the production of food preparations from potatoes and similar farinaceous tubers, and aims at producing products of a crisp nature, which have an attractive taste and appearance, good storing properties and do not require any further preparation, such as cooking or baking, prior to consumption.

More particularly, the invention relates to the production of food preparations by a process which comprises forming a mash, for example by subjecting peeled potatoes or similar farinaceous tubers to a cooking process and mashing the thus treated material, whilst if desired adding other ingredients such as cheese and/or fats, converting the mashed product into a form, such as extruded shapes, adapted for rapid and uniform drying, subjecting such shapes to a short intense baking treatment and finally drying the product to a low moisture content.

A process of this kind has been described in British patent specification No. 569,914.

The present invention is based on the discovery that the economy of processes of the foregoing type can be cheapened whilst at the same time the resultant products can be improved by increasing the total solid content of the mash of potato or other farinaceous tuber, prior to the conversion of said mash into extruded or otherwise shaped pieces.

This is effected, in accordance with the present invention, by incorporating with said mash, a suitable proportion of an edible starch in the form of a dry powder.

Edible starches suitable for the purpose of the present invention are for example, potato flour, arrowroot flour, edible flour made from any other cereal or banana flour.

The proportion of edible flour which can be incorporated with the potato or other mash can vary within wide limits and depends on various factors, such as the nature of the farinaceous tuber used, the methods employed for cooking and converting into mash and the nature of the edible flour.

The upper limit of the proportion of added edible flour is reached when the mixture ceases to flow under pressure, becomes sticky or loses its coherence.

In general however, the edible flour can be incorporated with the mash in a proportion lying between 20% and 120% of the solid content of the mash.

In carrying out the invention it has been found that the best results are obtained if the constituents of the mixture of potato or other mash and the added flour are so selected and/or adjusted that the mixture consists partly of dextrinised starch and partly of unicellular undamaged starch.

Such adjustment can be effected for example by producing a mash of potato or other farinaceous tuber in the manner set forth in British patent specification No. 569,914, in which part of the starch is dextrinised and some of the starch cells are burst, and incorporating with said mash an edible flour in which the starch cells are in the unicellular unbroken state.

Alternatively the mash of potato or other farinaceous tuber can be prepared in such a manner that all the starch cells therein are in the unicellular unbroken state and a slightly dextrinised flour such as roller-dried potato flour, can be incorporated with said mash to give the requisite proportion of dextrinised starch.

Mashes prepared in the manner hereinbefore set forth can be subjected to extrusion to form rods, filaments, tubes or the like which are subsequently baked and dried in the manner set forth in British patent specification No. 569,914, to yield a product which is attractive in appearance, crisp and very palatable.

The invention will be illustrated by the following Examples:

Example I

Graded potatoes are treated in a commercial washing and rubbing machine in order to remove the outer skin. The washed potatoes are then cut into slices about ½ inch thick. The potato slices are immersed in water which has just commenced to boil, thus cooling the water to below boiling point. The heating of the water is so regulated that it recommences to boil (simmer) within 2 to 3 minutes of the immersion of the potato slices. The potato slices are thereafter allowed to remain in the boiling water for a further period of 8 to 9 minutes. During this period care should be taken to allow the water merely to simmer and not to boil vigorously in order to obviate dextrinisation of the starch cells.

The treated potato slices are then removed from the water and converted into a mash while still warm, by means of a mixing or mincing machine of a type well known in the art, which is so adjusted that the starch cells of the mash remain undamaged.

Roller-dried potato flour is next incorporated with the resultant mash in the proportion of 9 ozs. of flour to 10 lbs. of mash. By virtue of its method of production the roller-dried potato flour contains a substantial proportion of burst starch cells and slightly dextrinised starch and when reconstituted yields a sticky gluey mash.

However, the mixture of potato mash and potato flour is a coherent non-sticky product which can be extruded or otherwise shaped without difficulty.

Salt and/or other flavouring ingredients may be added to the mixture if desired.

The resultant shapes are subjected to a rapid and uniform baking in two stages, the first being carried out at a temperature of 240° C. for a period of about 8 to 12 minutes and the second at a temperature of 140° C. for a period of 5 to 8 minutes.

The thus baked product is finally dried to a low moisture content at a temperature of 60° C. yielding a crisp and palatable food preparation.

The ratio of roller-dried potato flour to potato mash can be increased up to a maximum of 15 to 20 ozs. of potato flour to each 10 lbs. of potato mash, the limit being attained when the mix becomes sticky.

Example II

Graded potatoes are washed and peeled. They are then cut into slices of a thickness of about ¾ inch. The slices are next immersed in vigorously boiling water and are kept immersed therein for a period of 14 minutes after boiling recommences. By virtue of this treatment, some of the potato cells are burst and part of the potato starch is dextrinised.

The potato slices are then removed from the water and converted into a mash in a suitable mixing or mincing machine.

Potato powder known in the trade as "mashed potato powder" and made for example by the process described in United States Patent Specification No. 2,381,838 is next incorporated with a resultant mash in the proportion of 11 ozs. of potato powder to 10 lbs. of mash.

The "mashed potato powder" employed is produced in such a way that it consists substantially of unicellular and undamaged particles or groups of cells with intact and undamaged walls, or very slight dextrinisation having taken place. By virtue of its method of production, such potato powder will yield, on reconstitution with water, a non-sticky potato mash.

The mixture produced in the manner hereinbefore set forth is a non-sticky coherent mass which is capable of being shaped.

Salt and/or other flavouring ingredients may be added to the mixture if desired.

The final mixture is thereupon converted into shaped pieces, for example, by passing it between rollers or through a suitable extruding machine.

Said shaped pieces are thereupon baked in two stages, the first stage being carried out at a temperature of between 260° and 270° C. for a period of 12 minutes and the second at a temperature of 140° C. for a period of 4 minutes.

The product is finally dried to a low moisture content at a temperature between 55 and 60° C. yielding a crisp straw-like food preparation.

I claim:

1. A process for the production of food preparations from potatoes, which comprises cooking the potatoes in water and converting said cooked potatoes into a mash, said cooking being carried out to such an extent that such mash consists of unicellular unbroken and undextrinised cells, adjusting the consistency and nature of said mash by incorporating therewith a dry powdered edible starch material from an extraneous source in the form of a dry powder containing dextrinised starch and damaged starch cells, extruding the mixture into a form suitable for rapid and uniform drying, and thereupon baking and drying the resultant product.

2. A process for the production of food preparations from potatoes which comprises cooking the potatoes in water and converting the cooked potatoes into a mash, said cooking being carried out to such an extent that such mash contains dextrinised starch and damaged starch cells, adjusting the consistency and nature of said mash by incorporating therewith a dry powdered edible starch material from an extraneous source in the form of a dry powder and consisting of unicellular unbroken and undextrinised starch cells, extruding the mixture into a form suitable for rapid and uniform drying, and thereupon baking and drying the resultant product.

3. A process for the production of food preparations from potatoes, which comprises forming a cooked potato mash material, incorporating therewith a dry powdered, edible starch material, one of said materials containing dextrinised starch and damaged starch cells, mixing said materials in a proportion such that the resultant mass contains sufficient dextrinised starch and damaged starch cells to impart coherence to the mass without rendering the same sticky, extruding the mass into a form suitable for rapid drying and thereafter baking and drying.

MARTIN CARL SCHAUL.

REFERENCES CITED

The following references are of record in the file of this patent:

UNITED STATES PATENTS

| Number | Name | Date |
| --- | --- | --- |
| 1,718,211 | Baker | June 25, 1929 |
| 2,381,838 | Rendle | Aug. 7, 1945 |
| 2,401,392 | Ware et al. | June 4, 1946 |

FOREIGN PATENTS

| Number | Country | Date |
| --- | --- | --- |
| 569,914 | Great Britain | June 14, 1945 |